Nov. 6, 1956  W. WUHRMANN  2,769,467
MITER BOX WITH SWINGING SAW GUIDE
Filed Oct. 15, 1952  5 Sheets-Sheet 1

INVENTOR:
WALTER WUHRMANN
BY
ATTORNEY

Nov. 6, 1956   W. WUHRMANN   2,769,467
MITER BOX WITH SWINGING SAW GUIDE
Filed Oct. 15, 1952   5 Sheets-Sheet 2

INVENTOR:
WALTER WUHRMANN
BY *A. John Michel*
ATTORNEY

Nov. 6, 1956   W. WUHRMANN   2,769,467
MITER BOX WITH SWINGING SAW GUIDE
Filed Oct. 15, 1952   5 Sheets-Sheet 3

INVENTOR:
WALTER WUHRMANN
BY
ATTORNEY

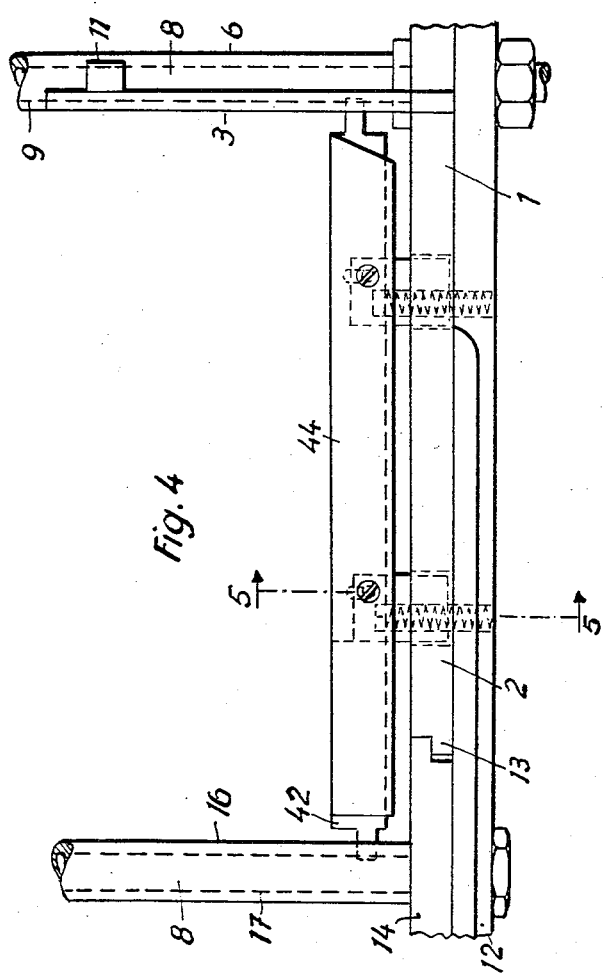
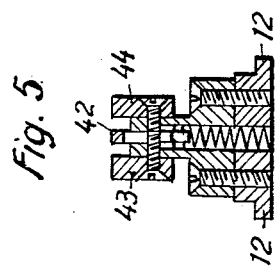

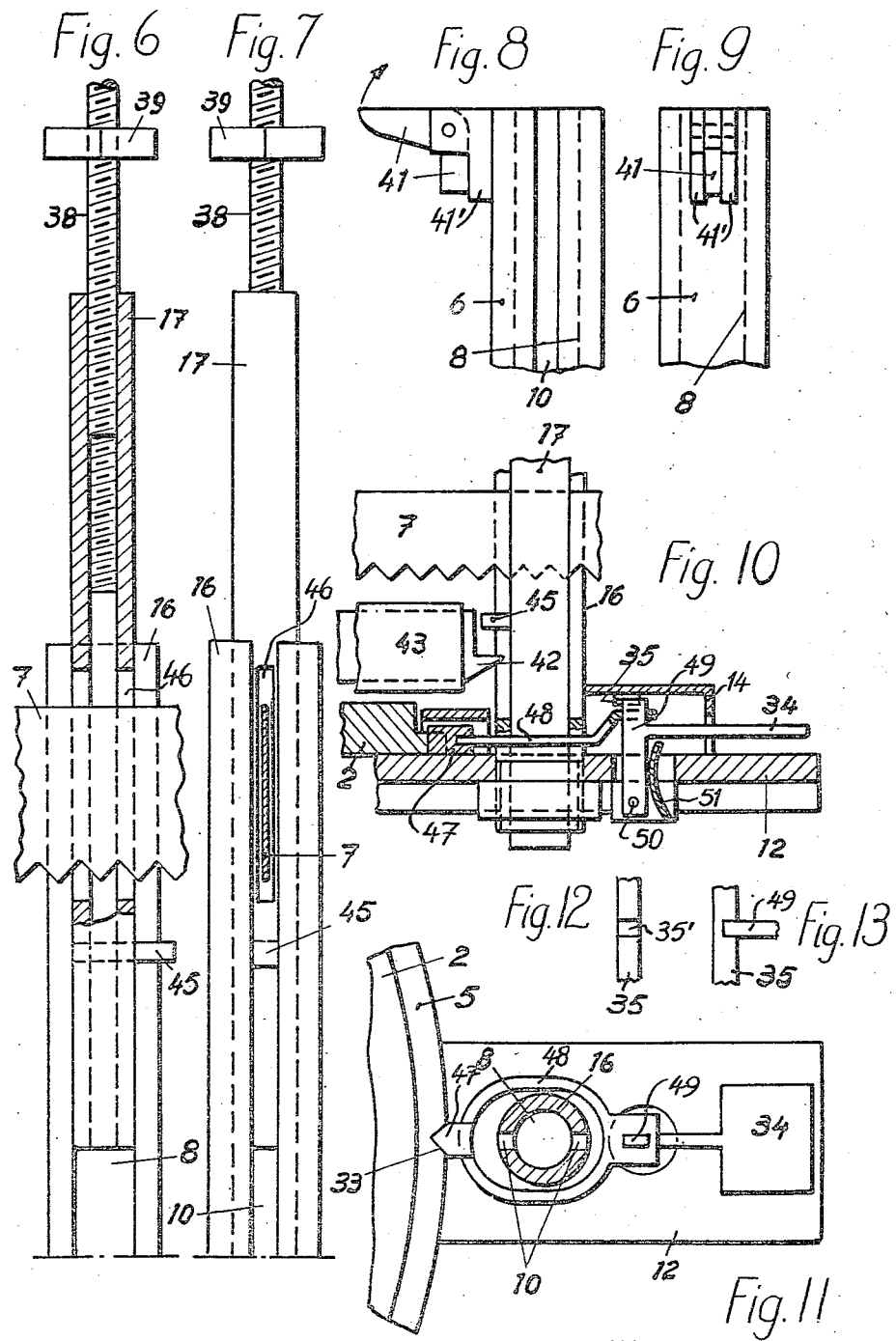

United States Patent Office 2,769,467
Patented Nov. 6, 1956

2,769,467

MITER BOX WITH SWINGING SAW GUIDE

Walter Wuhrmann, Zurich, Switzerland

Application October 15, 1952, Serial No. 314,765

Claims priority, application Switzerland October 17, 1951

3 Claims. (Cl. 143—89)

The invention relates to a mitre saw having a device for adjusting it at definite angles to the work piece.

The novel feature of the invention is that there are provided, for suspending the saw, two rockable guide members one of which has its axis of rotation in the plane of the stop and guiding plate of the work piece.

In the case of the mitre saw according to the invention, the working stroke of the saw and, consequently, the utilisation of the saw blade are increased in comparison with known saws in which the rear guiding member is located behind the fulcrum of the adjusting lever.

An embodiment of the subject matter of the invention is represented in the accompanying drawings, of which Fig. 1 is a top plan of the mitre saw;

Figs. 4 and 5 show details.

Figs. 6 and 7 show a partial section and a side view, respectively, of the guiding members for the saw.

Fig. 8 and 9 are side and front views, respectively, of one detail.

Figs. 10 and 11 show a section and top view, respectively, of another detail; and Figs. 12 and 13 show a specific detail of Fig. 10.

Figure 1:
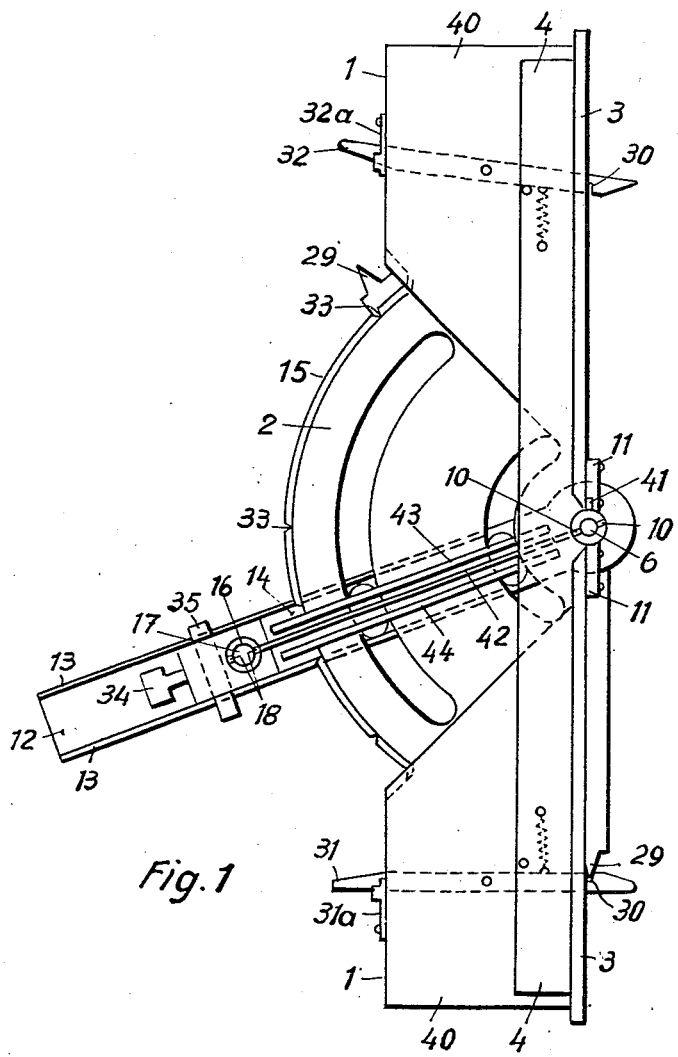

As shown in Fig. 1, the mitre saw comprises a base plate 1, which is preferably made of light metal and which has, in front, i. e., in the direction of the operator, a circular bulge 2 which is formed as a graduated disc. Rigidly connected with this base plate 1 is a vertically arranged stop and guiding plate 3 for the work piece 4, which plate is likewise preferably made of light metal. Also, rockably arranged on the base plate 1 or on the graduated disc 2 is an adjusting lever 12 on which are fixed two guiding members 6 and 16 on which the actual saw is suspended and guided. Passing through an opening in the stop plate 3 is a semicircular lug 5 of the base plate 1, in which lug 5 one guiding member 6 of the saw is mounted, whilst the other guiding member 16 is mounted on the lever 12 outside the graduated disc, as near as possible to the latter, in the direction of the operator. The guiding member 6 consequently has its axis of rotation in the plane of the stop plate 3. The stop plate 3 is consequently divided by the guiding member 6 into two separate plates, the ends of which, that are adjacent to the guiding member 6, are bevelled at an angle of approximately 45° in the direction of the axis of the guiding member 6. These bevelled parts render possible the adjustment of the saw blade 7 at any time at an angle of 45° to the stop plate 3 or to the longitudinal edge of the work piece 4 being cut.

Figure 3:
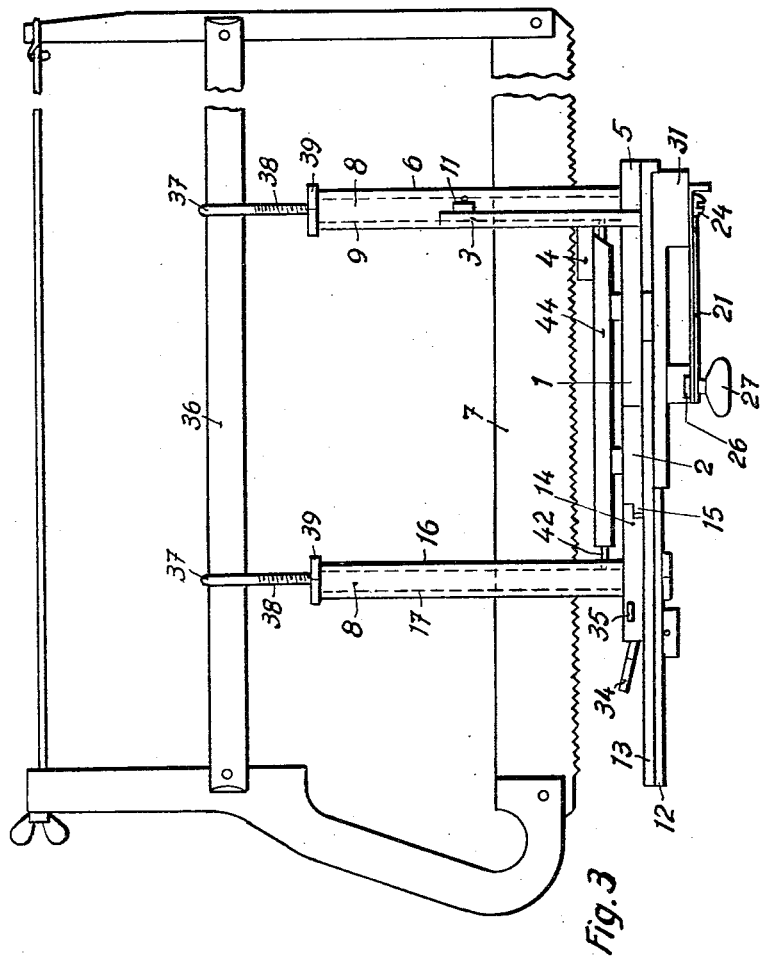
Fig. 3 is a side elevation, whilst

The two guiding members 6 and 16 each have, within them, a longitudinal bore 8 and have respectively diametral longitudinal slots 10 and 18. Guiding slides 9 and 17 are respectively longitudinally displaceable in the bores 8. These guiding slides 9 and 17 guide the saw blade 7 in a longitudinal slot 46. The bow 36 of the saw is attached to extension rod 38, by means of a ring 37, extension 38 being threadedly mounted in each guiding slide. Nuts 39 are screwed onto extension rods 38 to limit the downward movement of guiding slides 9, 17 in guiding members 6, 16 and thus to limit the downward movement of the saw, i. e. the depth of the cut in the work piece. In Fig. 3, nuts 39 contact the guiding members and the saw can, therefore, not be moved further downwardly.

In order to obtain a solid support of the guiding member 6 together with the guiding plate 3, there is provided, immediately below the top edge of the latter on its rear side on each side of the guiding member 6, a support 11 which is screwed to the corresponding stop plate and the end face of which, that abuts against the round guiding member 6, in concave and fits the guiding member 6 tightly.

The adjusting lever 12 has, on each of its longitudinal sides, a guiding groove 13. Rigidly connected with the surface of the adjusting lever 12 is a stop 14 which, with its end that abuts against the graduated disc 2, is offset in such a manner that a rib 15, which is arranged along the circumference of the graduated disc 2, comes to lie in the offset so that the adjusting lever 12 lies there fixed upwardly and downwardly but is rockable laterally beneath the graduated disc 2.

Beneath the base plate 1 there is arranged a frame which consists of four bars 19, 20, 21 and 22 and has four pivots 23, 24, 25 and 26 and the front hinge 21, 26, 22 of which is connected through a sliding device 28 that can be clamped by means of a winged screw 27, whilst the opposite hinge 19, 24, 20 is rigidly fixed to the bottom extension of the guiding member 6. The two arms 19 and 20 of the hinge 19, 24, 20 each have, on their outer end, a gripper 29, which grippers can engage in corresponding grooves 30 in two setting levers 31 and 32 which are rockable on the under surface of the base plate 1. The two setting levers 31 and 32 are acted upon by a tension spring and, when in the uncoupled condition, are pulled against a stop arranged in the base plate 1. They can be stopped or put out of use by means of levers 31a and 32a which are rockably arranged on the front side of the base plate 1.

Figure 2:
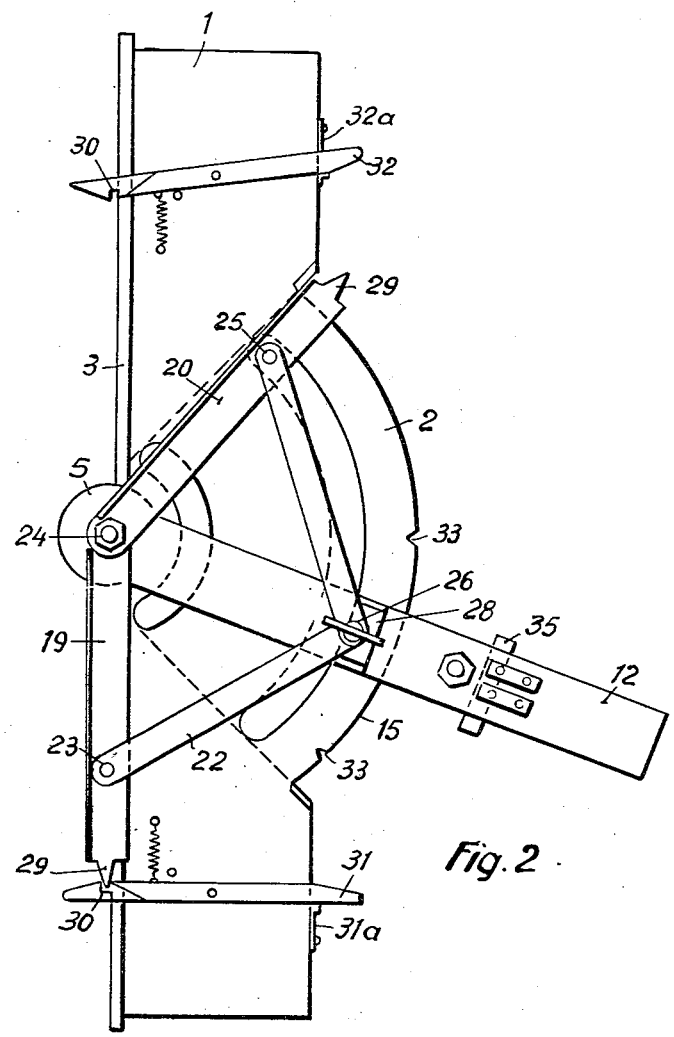
Fig. 2 is an underneath plan.

For the purpose of bracing the adjusting lever 12 with the base plate 1, the two grippers engage at the same time with the setting levers 31 and 32 associated with them, only if a fixing of the adjusting lever 12 at an angle of 90° to the stop plate or to the work piece 4 has to take place. Now, if sawing is to take place at any angle of less than 90° to the stop plate 3, only one gripper 29, namely the gripper 29 adjacent to the angle, is coupled with the neighbouring setting lever 31. In the position shown in Figs. 1 and 2, the gripper 29, for example, is in engagement with the groove 30 in the setting lever 31. If, on the other hand, the adjusting lever 12 is to be set at a greater angle than 90° to the stop plate 3 or the work piece 4, the gripper 29 is coupled with the groove 30 in the setting lever 32, whilst the gripper 29 is to be disconnected from the setting lever 31. The arrangement of the frame 19, 20, 21, 22 does not, in such a position of the adjusting lever 12, allow a simultaneous coupling of the gripper 29 with the setting levers 31 and 32.

Since, preferably, sawing is carried out at angles of 45° and 90° to the stop 3, there are provided, along the periphery of the graduated disc 2, corresponding notches 33, into which there can snap a spring-influenced pin or wedge 47 which is located inside the stop 14. In order to render it possible to rotate the adjusting lever 12 into another position, this pin must be lifted out of this particular notch. For this purpose, wedge 47 is connected to one end of slide 48 which, at its other end, has a cutout holding lever 39 which is pivotable around fulcrum 50. Lever 49 is connected to plate 34 and is held under pressure of spring 51. When plate 34 is depressed, lever 49 is pivoted clockwise against the pressure of spring 51, slide 48 is moved to the right (as viewed in Fig. 10) and pin or wedge 47 is thus removed from notch 33. As soon as the pressure is released, the pin can again snap into one of the three notches 33. Now, in order to render possible a rotation of the adjusting lever 12 without continuing to keep the releasing device or its plate 34 depressed, there is arranged, inside the stop 14 and in front of the guiding member 16, an horizontal slide 35 which, by pressure of a finger, can be adjusted in such a manner that the pin is kept stopped. As shown in Figs. 12 and 13, slide 35 has a transverse groove 35' which is normally engaged by the end of lever 49. When the lever is pivoted by depressing plate 34, slide 35 is disengaged so that it can be transversely moved and thus block the return of lever 49 to its normal position. Consequently, the pin cannot snap into the notches 33 of the graduated disc 2 until the slide 35 is shifted until the end of lever 49 re-engages groove 35'.

In order to prevent the base plate 1 from being sawn or to preserve the teeth of the saw blade, there is fixed on the base plate a wooden board 40 on which the work piece 4 rests.

Fixed on the top end of the guiding member 6 on its outer surface is a catch 41 which can snap into corresponding notches (not shown in the drawings) which are provided on the surface of the guiding slide 9, so that, when the saw blade is not being used, it is kept away from the work piece 4. The catch is shown in Fig. 8 as a bell-crank lever 41 mounted in bracket 41'.

Away from the adjusting lever 12 and in a line extending longitudinally over the middle thereof a gauge line, in the form of a straight-edge 42, is arranged; this gauge line lies in a vertical plane passing through the saw blade or its cutting edge. The straight-edge 42 is, in the manner shown in the drawings, resiliently arranged vertically to the adjusting lever 12 and is enclosed between two cheeks 43 and 44 which are rigid with the adjusting lever.

The straight-edge 42 serves for marking the position at which the saw must come on to the base. For this purpose, a mark is put, for example with pencil, on the work piece at the position at which the cutting has to take place and this mark is made to register with the straight-edge. The straight-edge is resiliently arranged vertically in the manner shown in the drawings, in order that it may be able to turn aside downwards when the saw reaches the base. For this purpose, there are arranged, on the guiding slides 9 and 17, projections 45 which press the straight-edge 42 downwards out of the reach of the cutting edge of the saw before the latter reaches its lowest position.

Owing to the arrangement of a straight-edge in the manner described, it is possible generally to cut all work pieces, especially of a curved form, i. e., in a form provided with flutes, with certainty.

What I claim is:

1. A mitre box for adjusting a saw-blade at different angles to a work piece, comprising a base plate, a stop and guiding plate for the work piece, a graduated disc, a saw-blade adjusting lever rockable over said graduated disc, two guiding members fixed on said adjusting lever, one of said guiding members having its axis of rotation in the plane of said stop and guiding plate, said adjusting lever having a four-link hinged frame arranged beneath the base plate, for fixing said adjusting lever at any desired angle to said stop and guiding plate, the frame links being connected by a front pivot, a back pivot and two lateral pivots, a sliding device connecting the front pivot with said adjusting lever, the back pivot being rigid with said one of said guiding members, the two frame links connected to said back pivot having grippers at their respective ends, and two spring-influenced lockable setting levers rockably fixed beneath said base plate, said grippers being adapted to engage said setting levers respectively.

2. The mitre box of claim 1, wherein the saw-blade adjusting lever has lateral longitudinal grooves therein, the sliding device is arranged to slide in said longitudinal grooves and there is provided a set screw for fixing the sliding device to the adjusting lever.

3. A mitre box for adjusting a saw-blade at different angles to a work piece, comprising a stop and guiding plate for the work piece, a graduated disc, a saw-blade adjusting lever, two guiding members fixed to said lever, one of said guiding members having its axis of rotation in the plane of said stop and guiding plate, and a resiliently mounted straight-edge device arranged along said adjusting lever and in a vertical plane passing through the saw-blade, said adjusting lever being rockable over said graduated disc.

References Cited in the file of this patent

UNITED STATES PATENTS

| | | |
|---|---|---|
| 335,738 | Booyer | Feb. 9, 1886 |
| 506,433 | King | Oct. 10, 1893 |
| 542,738 | Levan | July 16, 1895 |
| 645,106 | Leisifer | Mar. 13, 1900 |
| 661,444 | Coy | Nov. 6, 1900 |
| 734,185 | Levan | July 21, 1903 |
| 798,818 | Morris | Sept. 5, 1905 |
| 948,022 | Potter | Feb. 1, 1910 |
| 1,182,068 | Ayer | May 9, 1916 |
| 1,663,247 | Edwards | Mar. 20, 1928 |
| 1,808,611 | Running | June 2, 1931 |
| 2,289,142 | Parsons | July 7, 1942 |